United States Patent [19]
Rowe et al.

[11] Patent Number: 5,342,425
[45] Date of Patent: Aug. 30, 1994

[54] FABRICATION OF FUSED FIBRE DEVICES

[75] Inventors: Christopher J. Rowe, Ipswich; David B. Mortimore, Trimley St Mary; Iain J. Wilkinson, Felixstowe; Nicholas E. Achurch, Woodbridge, all of England

[73] Assignee: BT&D Technologies Limited, Suffolk, England

[21] Appl. No.: 155,024

[22] Filed: Nov. 1, 1993

Related U.S. Application Data

[62] Division of Ser. No. 835,439, Feb. 28, 1992, Pat. No. 5,288,301.

[30] Foreign Application Priority Data

Sep. 1, 1989 [GB] United Kingdom ............. 8919800

[51] Int. Cl.⁵ .................................... C03B 37/025
[52] U.S. Cl. .................................. 65/501; 65/157; 65/407; 65/508; 219/388; 219/494
[58] Field of Search ............. 65/3.11, 4.2, 157, 4.21, 65/11.1, 29, 32.2; 219/494, 364, 388

[56] References Cited

U.S. PATENT DOCUMENTS

| | | | |
|---|---|---|---|
| 4,295,033 | 10/1981 | Lindgren et al. | 219/388 |
| 4,584,464 | 4/1986 | Myer | 219/354 |
| 4,879,454 | 11/1989 | Gerdt | 219/494 |
| 5,141,545 | 8/1992 | Grigsby | 65/4.2 |
| 5,205,851 | 4/1993 | Suganuma et al. | 65/4.21 |

FOREIGN PATENT DOCUMENTS

| | | |
|---|---|---|
| 0174014 | 12/1986 | European Pat. Off. |
| 0234326 | 2/1987 | European Pat. Off. |
| 2587502 | 3/1987 | France. |
| WO88/03661 | 5/1988 | World Int. Prop. O. |
| WO91/0334-36 | 3/1991 | World Int. Prop. O. |

*Primary Examiner*—Robert L. Lindsay
*Attorney, Agent, or Firm*—Nixon & Vanderhye

[57] ABSTRACT

Apparatus for fabricating fused optical fibre devices comprises a furnace provided with an electric heating element (5). A heat-distributing insert (7) is provided within the heating element (5), the heating element and the insert being sized and shaped to define a heating chamber for an optical fibre arrangement. The apparatus includes means for passing electric current through the heating element (5), and means (8) for supplying and maintaining an inert atmosphere within the heating chamber.

26 Claims, 3 Drawing Sheets

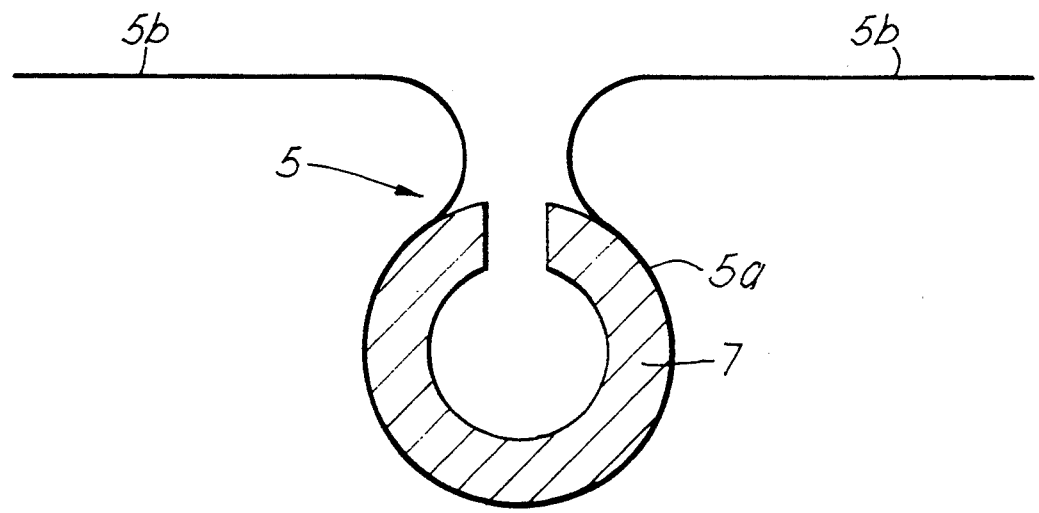
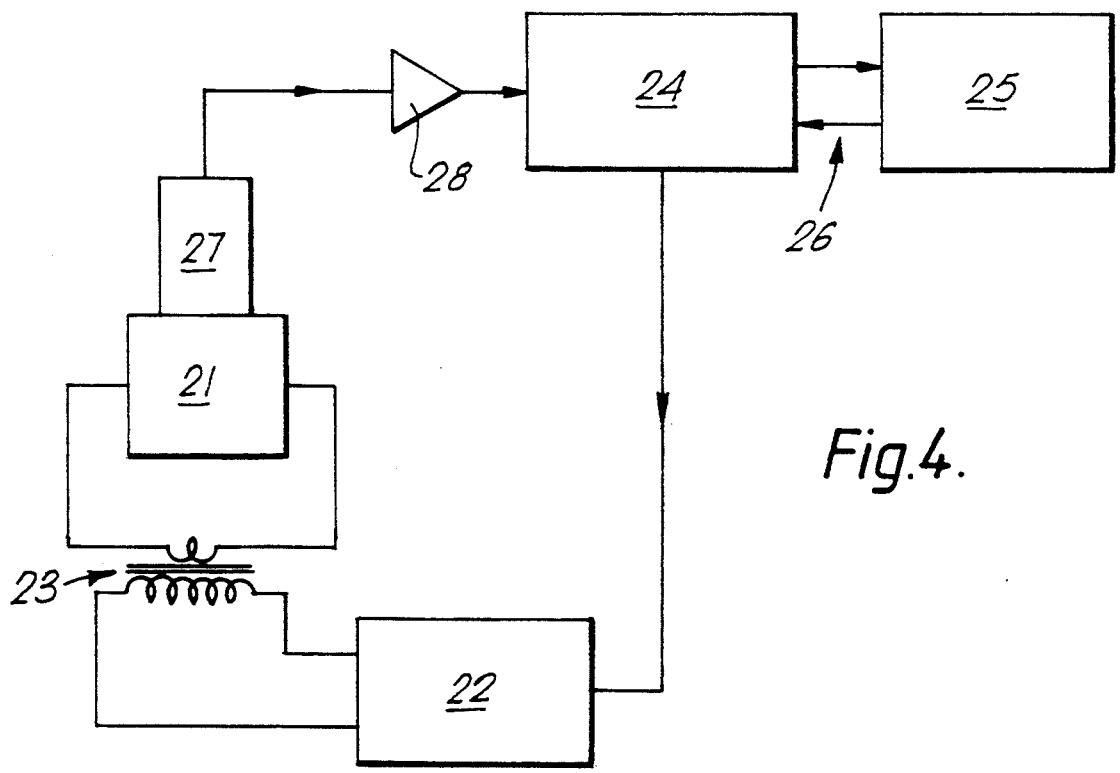
Fig.4.

FABRICATION OF FUSED FIBRE DEVICES

This is a divisional of application Ser. No. 07/835,439, filed Feb. 28, 1992, now U.S. Pat. No. 5,288,301 which corresponds to PCT Application Nos. PCT/GB90/01345, filed Aug. 31, 1990 and 8919800.6, filed Sep. 01, 1989, in Great Britain, respectively.

This invention relates to apparatus for, and a method of, fabricating fused optical fibre devices, for example for the purpose of making fused fibre couplers.

The standard method of fabricating fused fibre devices is to heat twisted fibres in a bunsen flame while stretching the fibres. An important fundamental step in the fabrication of fused fibre devices is, therefore, the fibre heating process which is required to raise the temperature of the fibres sufficiently for the glass to flow in response to an applied force. For silica fibres, this temperature is generally greater than 1500° C. To achieve repeatable low loss devices this heating source must be both clean and well controlled. For example, to fabricate fused fibre couplers, the temperature profile should be uniform along the heated length of the fibres, so that a gradual adiabatic taper is obtained, and the temperature must be carefully adjusted to stop bending and general distortion of the fibres due to excessive temperature in combination with the applied tension. The heat source normally employed for this purpose is a gas (such as a mixture of hydrogen, nitrogen and oxygen) flame. By adjusting the relative proportions of these gases, it is possible to vary the flame temperature. However, it is difficult to obtain the required temperature uniformity both temporal and spatial, and the fibres can be easily distorted by the pressure of the flowing gas striking the softened glass.

With the introduction of wavelength-flattened couplers and wavelength multiplexers, the heating difficulties increase, and much better control of the heating source is required if high performance devices are to be fabricated with high yield. In the fabrication of standard fused couplers, the fibres are elongated until the required coupling ratio is obtained at the specified wavelength. So long as the taper is sufficiently gentle, the actual taper shape and degree of fusion of the fibres is relatively unimportant, and the desired coupling ratio will always be achieved. The performance of wavelength-flattened couplers and wavelength multiplexers, on the other hand, depends critically on the actual taper shape and degree of fusion of the fibres. As the viscosity of silica follows an exponential law with temperature, the temperature control must be very precise in order to obtain repeatedly identical components to a given specification.

The present invention provides apparatus for fabricating fused optical fibre devices, the apparatus comprising an electric heating element, a heat-distributing insert within the heating element, an elongate heating chamber for an optical fibre arrangement being defined within the heating element and the insert, means for passing electric current through the heating element, and means for supplying and maintaining an inert atmosphere within the heating chamber, wherein the insert extends substantially the entire length of the heating chamber so that, in use, the heating chamber attains a substantially uniform temperature, and wherein the combined thermal capacity of the heating element and the insert is such that an optical fibre device placed within the heating chamber can be heated to fusion temperature in less than 30 seconds.

In a preferred embodiment, said combined thermal capacity is such that fusion temperature is reached in less than 10 seconds, and preferably after at least 1 second.

Advantageously, the heating element has a generally C-shaped portion which defines the heating chamber, the C-shaped portion having a diameter of between 4.5 mm and 5 mm, and preferably of 4.7 mm. Where the apparatus is used to make single fibre tapers, the C-shaped portion may have a length of between 2 and 5 mm. Alternatively, where the apparatus is used to make devices such as fibre couplers, it is preferable for the C-shaped portion to have a length of between 9 and 15 mm. Preferably, the heating element is made of tungsten or tantalum.

Conveniently, the insert is made of ceramic material, and preferably is a slotted alumina tube, the slot in the tube being aligned with the opening in the C-shaped portion of the heating element, the insert having a wall thickness of 0.95 mm and a slot width of 1.0 mm.

In a preferred embodiment, the heating element further comprises wing portions extending in opposite directions away from the C-shaped portion, the wing portions being clamped to conductive blocks which form the base of the apparatus, the conductive blocks being separated by an insulating spacer and constituting electrodes for supplying electric current to the heating element. The apparatus may further comprise a top which fits over the base, the top comprising a pair of conductive blocks which are separated by an insulating spacer, the conductive blocks of the top being aligned with the conductive blocks of the base. Advantageously, sealing means are provided between the top and the base, the sealing means being effective to maintain an inert atmosphere within the heating chamber. The top and the base may be provided with complementary alignment means.

Preferably, the insulating spacers between the blocks of the top and the base are such that, when the top and the base are fitted together, a channel is defined by the blocks and the spacers, the channel passing substantially centrally through the apparatus and constituting an optical fibre arrangement receiving channel. Advantageously, the channel has a widened, cigar-shaped, central portion for receiving the heating element, the widened portion being formed by cut-out portions in the blocks. A gas inlet pipe may pass through one of the blocks and opens into the central region of the widened channel portion, and the apparatus may further comprise means for supplying an inert gas to the inlet pipe at a pressure slightly greater than atmospheric.

Conveniently, the apparatus further comprises a silica rod window provided in one of the insulating spacers, the silica rod window being aligned with the central region of the widened channel portion. In this case, the apparatus may further comprise a pyrometer which can be aligned with the silica rod window so as to measure the temperature within the heating chamber. Preferably, the temperature measured by the pyrometer is used to control the electric current supplied to the heating element via a temperature controller and a thyristor power controller, the temperature controller being controlled by a computer, and the thyristor power controller controlling the supply of AC power to the heating element via a step-down transformer.

The invention also provides a method of fabricating fused optical fibre devices, the method comprising the steps of positioning an optical fibre arrangement within an elongate heating chamber, the heating chamber being defined within an elongate heat-distributing insert positioned within an electric heating element, and the insert extending substantially the entire length of the heating chamber whereby the heating chamber can attain a substantially uniform temperature, raising the temperature of the optical fibre arrangement to the fusion temperature of the fibres by passing an electric current through the heating element, and stretching the optical fibre arangement when the optical fibres are at their fusion temperature, wherein the heating chamber is provided with an inert atmosphere during the fusion process, and wherein the combined thermal capacity of the heating element and the insert is such that the fusion temperature is reached in less than 30 seconds.

In a preferred embodiment, said combined thermal capacity is such that the fusion temperature is reached within 1 to 10 seconds.

Preferably, the supply of electric current to the heating element is controlled in dependence upon the temperature within the heating chamber.

Advantageously, the temperature in the heating chamber is reduced at a predetermined point in the stretching process. Preferably, the temperature in the heating chamber is reduced when optical coupling of the optical fibre arrangement is observed.

An electric furnace for fabricating fused fibre devices and constructed in accordance with the invention will now be described in detail, by way of example, with reference to the accompanying drawings, in which:

BRIEF DESCRIPTION OF THE DRAWINGS

FIG. 3 is an end elevation of the heating element of the furnace; and,

FIG. 4 is a schematic circuit diagram showing the temperature control system of the furnace.

Referring to the drawings, FIG. 1 shows the bottom half of the furnace, this bottom half having a pair of stainless steel blocks 1a and 1b mounted on a ceramic insulating base 2. The base 2 may be made of a ceramic material or of standard resin bonded fibre (SRBF) material. A ceramic spacer 3 separates the blocks 1a and 1b, and defines a channel 4 between the two blocks at their upper portions. This channel is 2 mm in width act its ends, and has a central, cigar-shaped, widened portion 4a.

A heating element 5 is positioned centrally within the widened channel portion 4a. The heating element 5 is made of tungsten foil, and has a central C-shaped portion 5a and a pair of arms 5b (see FIG. 3). The diameter of the C-shaped portion 5a is 4.7 mm. The arms 5b of the heating element 5 are fixed to, and in electrical contact with, the blocks 1a and 1b by clamps 6 associated with the blocks. Each clamp 6 has a lower clamp member 6a fixed to the upper surface of the associated block 1a or 1b, and an upper clamp member 6b which can be clamped to the associated lower clamp member (with an arm 5b of the heating element 5 positioned therebetween) by means of clamping screws 6c. As shown in FIG. 3, the C-shaped portion 5a of the heating element 5 contains a slotted, tubular, ceramic insert 7, having a wall thickness of 0.95 mm and a slot width of 1.0 mm. The dimensions of the heating element 5 and the insert 7 result in a low combined thermal capacity for these items. This combined thermal capacity should be low enough to ensure rapid heating, but high enough to smooth out temperature fluctuations.

Figure 1:
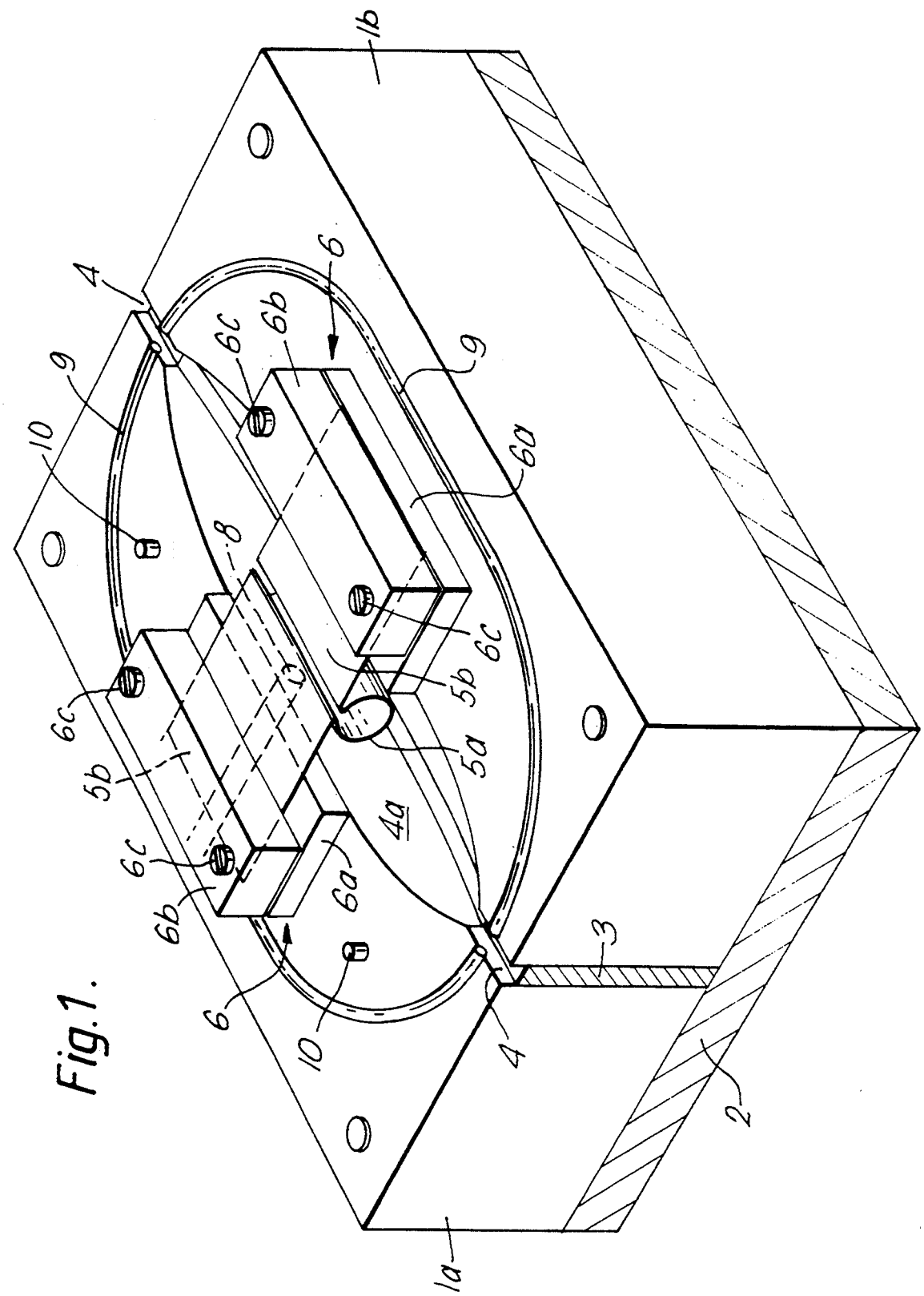
FIG. 1 is a perspective view of the bottom half of the furnace.

A gas inlet pipe 8, having a diameter of 3 mm, leads through the block 1a and into the centre of the widened portion 4a of the channel 4. In use, an inert gas (such as argon) is fed into the pipe 8 at a pressure slightly greater than that of the atmosphere. The blocks 1a and 1b are also provided with water cooling channels (not shown).

A small diameter O-ring seal 9 is seated in a channel formed in the upper surfaces of the blocks 1a and 1b. The seal 9 has two portions, each of which is associated with a respective block 1a or 1b, and the seal has a generally elliptical configuration which surrounds the widened channel portion 4a and the clamps 6. A pair of alignment pins 10 project upwardly from the upper surface of the block 1a.

Figure 2:
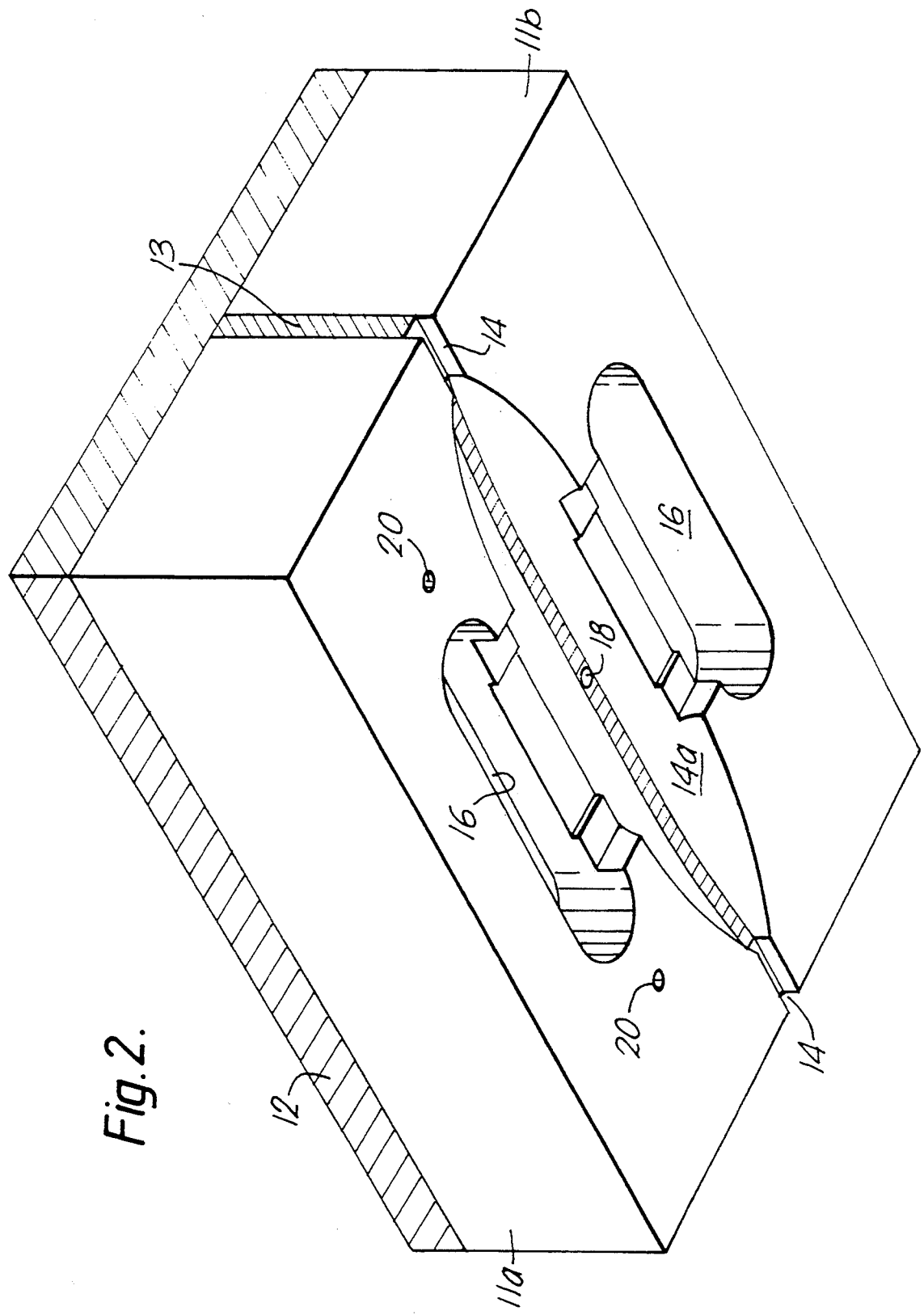
FIG. 2 is a perspective view of the top half of the furnace.

FIG. 2 shows the top half of the furnace, this top half having a pair of stainless steel blocks 11a and 1b mounted on an insulating base 12. The base 12 may be made of a ceramic material or of SRBF material. A ceramic spacer 13 separates the blocks 11a and 11b, and defines a channel 14 between the two blocks at their lower portions. The channel 14 is 2 mm in width at its ends, and has a central, cigar-shaped, widened portion 14a which is complementary to the cigar-shaped channel portion 4a of the bottom half of the furnace. Recesses 16 are formed in the lower surfaces of the blocks 11a and 11b to accommodate the clamps 6 when the furnace halves are fitted together. Alignment apertures 20 are formed in the lower surface of the block 11a, these apertures mating with the alignment pins 10 of the block 1a when the two halves of the furnace are fitted together in the correct alignment. Alternatively, and preferably, the two furnace halves are hinged together. A silica rod window 18 is formed in the ceramic spacer 13, the window 18 being aligned with the centre of the widened channel portion 14a. The window 18 permits observation of the interior of the furnace during operation, and also allows the temperature within the furnace to be measured using an optical pyrometer (not shown in FIG. 2), which will be described below with reference to FIG. 4.

FIG. 4 shows the system for controlling the temperature within the furnace cavity (the cigar-shaped hollow region formed by the widened channel portions 4a and 14a when the two halves of the furnace are correctly fitted together in alignment). The furnace 21 is supplied with a.c electric power for heating its element 5 via a thyristor power controller 22 and a 10 volt IkVA stepdown transformer 23. The power controller 22 is controlled, via a temperature controller 24, by a computer 25. The temperature controller 24 is a proportional integral derivative controller, for example one manufactured by Eurotherm. The controller 24 and the computer 25 are interconnected by a standard RS232 interface 26. A pyrometer 27 incorporating a silicon detector is used to measure the temperature within the furnace cavity (through the silica rod window 18), the output of the pyrometer being fed to the temperature controller 24 via an amplifier 28. This arrangement is effective to control the temperature within the heating cavity 4a, 14a to within about 2° C.

In use, if the furnace is to be used to make a fused fibre coupler, the fibres are twisted together in the normal manner and positioned in the channel 4 of the bottom half of the furnace (the top half of the furnace having previously been removed). The fibres are then held under tension in the known manner, and the top half of the furnace is fitted into position with the alignment pins 10 in mating engagement with the apertures 20, and with the O-ring seal 9 in sealing engagement with the lower surface of the blocks 11a and 11b. The fibres are then heated to their fusion temperature (about 1650° C.) by turning on the electric current. Because of the low thermal capacity of the heating element 5 and the insert 7, the fusion temperature is reached within about 8 seconds. This rapid temperature speed of response is important to ensure that the fabrication process is quick, and can be terminated rapidly when the desired optical performance of the coupler is achieved. The rapid response time also minimizes temperature overshoot, and hence temperature control problems. At the same time, an insert gas such as argon is supplied to the pipe 8, so that the gas enters the heating cavity 4a, 14a at the centre thereof and flows outwardly in both directions along the cigar-shaped cavity, finally escaping at the ends of the channels 4, 14. The flow of gas both ways from the centre of the heating cavity 4a, 14a ensures rapid purging of the atmosphere surrounding the fibres, and also assists with even temperature distribution. The cigar-shape of the cavity 4a, 14a helps to streamline the flow of inert gas, and so facilitates both purging and temperature distribution. As the fibres heat up to their fusion temperature (about 1650° C.), they are elongated by stepping motors (not shown) at a pulling tension of between about 0.2 to 0.5 gm. The tension is monitored by the computer 25 and controlled by varying the pulling velocity. Typically the fibre velocity is up to about 400 μm per second.

The shape of the heating element 5 provides near omnidirectional heating, and allows easy insertion and removal of the fibres. The diameter of the C-shaped portion 5a is important. If this diameter is too small, it will be difficult to obtain a uniform temperature along the heated length of the fibres, due to positioning and element fabrication tolerances. This can lead to the production of steep taper angles, and hence high wavelength dependent loss. If this diameter is made larger, higher element temperatures are needed in order to obtain the required fibre pulling temperature, and this wastes power and shortens element lifetime. It has been found that the optimum element diameter is 4.7 mm for a ceramic insert wall thickness of 0.95 mm.

Of course elements having diameters of about 4.7 mm, that is in the range 4.5 to 5 mm, may be used, possibly with ceramic inserts having wall thicknesses other than 0.95 mm, despite their non-optimum performance.

The length of the element 5 is selected according to the use to which the fibre devices which are to be produced are to be put. If the furnace is to be used for the production of single fibre tapers, rather than fibre couplers, a short element 5 is appropriate. Preferably, for such applications, the heating element 5 has a length of between about 2 and 5 mm, more preferably of between 2 and 3 mm, and most preferably of about 2 mm. Conversely, if the furnace is to be used for the production of devices such as fibre couplers, the heating element 5 should have a length of more than about 8 mm if excessive loss due to large taper angles is to be avoided. Typically, the heating element 5 will have a length of between 9 and 15 mm. It has been found that an element length of 10 mm is sufficient to guarantee the production of adiabatic tapers. Increasing the length of the heating element 5 results in an increase in the taper length, and this in turn means that couplers made using the furnace exhibit increasing wavelength selectivity. The element 5 is clamped at such a height that the axis of the heating zone lies 0.75 mm below the surface of the furnace edge, so that, with a 1.5 mm deep by 1.5 mm wide slot in both furnace edges, the fibres passing centrally through the slot lie along the heating zone axis.

One of the advantages of the type of furnace described above is that it facilitates reliable and repeatable production of long couplers for wavelength selective applications. The accurate control of a uniform temperature over an extended length, which the present invention makes possible, means that long couplers are much easier to produce than heretofore.

Furnaces according to the present invention could be used to produce couplers of almost any length. Certainly, heating elements of tens or even many tens of millimeters can be used, in an appropriately lengthened furnace, for the routine production of long couplers. There would seem to be no inherent reason why the heating element should not be 10, 15 or even 20 cm long, although there is currently little call for such long couplers. In general, the majority of couplers are produced using a heating element 10 mm in length.

Unlike the situation with known furnaces, the heating zone location within this furnace is very well defined, and the design of the furnace is such that heating zone movement is unlikely to occur, at least not in the short to medium term. As a result of having the heating zone at a well defined location, it becomes possible to achieve very high levels of reproducibility; i.e. from run to run, with the same settings, the same coupler performance should be achieved. For optimum reproducibility/repeatability, it is desirable to locate the fibre work-pieces at the same position within the furnace cavity for each run. Preferably, therefore, the fibre work-pieces are set at the same height within the furnace cavity for every run which is to produce notionally identical couplers. Preferably, the fibre handling parts of the apparatus are arranged so that it is easy to maintain a desired fibre position within the furnace from run to run. The heating zone within the furnace cavity appears, in practice, to provide a much more uniform temperature profile than was achieved in earlier devices, and that makes fibre alignment less critical.

The ring seal 9 ensures that a seal is formed between the top and bottom halves of the furnace (except at the ends of the two slots 4, 14). The inert gas serves to exclude oxygen from the furnace, to extend the lifetime of the heating element 5 and to maintain the fibre surfaces free from contamination. It is worth mentioning here that the performance of fibre couplers is critically sensitive to the presence of dust or other particulate contaminants during the fusion process. Consequently, it is important that the inert gas supplied to the furnace should be clean. It is, of course, not essential to use argon, it is however cheaper than helium, and other inert gases. Nitrogen is not recommended, however, since its use may tend to reduce electrode lifetime severely. High gas flow rates are preferably avoided, since, even with a streamlined furnace cavity, there is a risk that the fibres will move as a result of the gas flow. Preferably, therefore, the slots 4 and 14 are only just large enough to allow the fibres to pass through without risk of them touching the slot walls. It has been found that, for the dimensions given in relation to the preferred embodiment, a gas flow rate of 3 standard liters per minute is sufficient. It is important that, during drawing, the fibres do not touch any part of the furnace. Only very small tensions are applied to the fibres during the tapering process, and the risk is that contact with any part of the furnace would result in non-uniform pulling and distortion.

The main advantage of the furnace described above is that it ensures practically uniform heating along the entire length of fibres to be fabricated. This ensures reproducibility of the fabrication process for fused fibre devices, and also permits tapered filters and high performance devices to be fabricated with high yield. The provision of the ceramic insert 7 helps to ensure this uniformity of heating. Contamination of the fused fibres is prevented by the flushing of the heating cavity with an inert gas. Devices fabricated in this manner have the added advantage of having a low loss of less than 0.05dB. Moreover, because of the high degree of temperature control, the drawing process can be carried out at a much higher speed than is conventional, so that such low loss devices can be made in less than 2 minutes.

The degree or extent of coupling between the fibres is monitored during the drawing process. If a two fibre coupler is to be produced, two optical detectors, typically Ge PIN diodes, are coupled one to an end of each fibre. Preferably, the detectors are mounted in integrating spheres to reduce their sensitivity to the quality of coupling to the fibre ends. A tunable optical source (or more commonly two or more semiconductor lasers, which may be tunable) is coupled to the second end of one or other fibre. The optical detectors and the optical source are connected to the computer 25. During drawing, the input optical wavelength is switched, typically between two wavelengths with which the coupler is intended to be used, and the outputs from the two detectors are monitored. In this way, the computer 25 monitors the degree of coupling at selected wavelengths. When the outputs from the detectors indicate the correct degree of coupling, drawing is stopped.

Rather than using a constant temperature throughout the whole drawing process, it is preferable to commence drawing at one temperature and subsequently draw at a lower temperature. With conventional silica glasses, the furnace is initially heated to, and pulling commenced at, about 1650° C. Fibre drawing continues at this temperature unlike either optical coupling is observed or until the point is reached where, from previous experience, it is known that optical coupling will very soon take place At this point i.e. either just at the instant of coupling or shortly before it, the furnace temperature is dropped to somewhere in the region of 1350°–1400° C. The computer 25 is used to analyze the drawing velocity, and to control the furnace temperature accordingly, thereby keeping the drawing velocity at a constant low magnitude. Reducing the temperature in this way at this critical end stage of the drawing process makes it easier to control the precise degree of coupling obtained. The rapid temperature response time resulting from the low combined thermal capacity of the heating element 5 and the insert 7 facilitates this control. The increase in viscosity which results from the temperature drop is very useful in slowing down the drawing process at, or immediately after, the moment of optical coupling between the two fibres. This reduces the possibility of the drawing process being over done. Typically, the drawing process is terminated about 10 mm beyond this point. The addition of computer control makes it easier to take advantage of the precise control of coupling which is made possible by optical monitoring and temperature reduction. The repeatability of the present apparatus is such that, where a large run of identical couplers is required, it becomes possible, once the necessary process parameters have been determined, to draw simple fibre couplers without subsequent optical monitoring during the drawing step. Moreover, because of the high degree of temperature control, the drawing process can be carried out at constant tension, thereby facilitating the reproducability of the process.

It will be apparent that modifications could be made to the furnace described above. In particular, the combined thermal capacity of the heating element 5 and the insert 7 could be varied to suit different operational parameters. It is important, however, that the combined thermal capacity does not increase to such an extent that the temperature response time to fusion temperature reaches 30 seconds. Also, the combined thermal capacity should not be so low that the response time to fusion temperature falls below about 1 second, otherwise the fibres could be subjected to temperature fluctuations. Moreover, the heating element 5 could be made of materials other than tungsten, for example tantalum. Furthermore, the insert 7 could be formed integrally with the heating element 5, for example by applying a ceramic coating directly to the element. This coating would prevent contamination of the fibres and, if the coating is non-porous, would allow the heating element 5 to be used in an oxidizing atmosphere. A reasonably successful way of coating the heating element 5 with ceramic is by coating molybdenum with a layer of silicon to form a thin, tightly-adhering layer of mainly molybdenum disilicide. There are various techniques available for applying this coating. One of the most effective is to treat the molybdenum in an atmosphere of silicon tetrachloride and hydrogen at temperatures in the range of 1000°–1650° C. Molybdenum elements protected by coatings 80 μm thick can resist oxidation at 1800° C. for 500 hours and at 2000° C. for 100 hours. The other metals such as tungsten and tantalum which can be used to make the heating element, can be similarly protected.

Besides applying silicon there is the possibility of applying oxide coatings such as alumina, zirconia or silica. The main danger with these ceramic coatings is that they may crack and fall off due to expansion coefficient mismatch. Zirconia, in particular, undergoes several drastic volume changes on heating and cooling. The coatings may also be porous, but it may be possible to render them non-porous by sintering at high temperatures in an inert atmosphere. Techniques available for the application of these coatings include plasma spraying, RF sputtering, chemical vapour deposition and sol-gel deposition.

A particular advantage of furnaces according to the present invention is that they may be used in the production of fused fibre couplers, and other optical fibre devices, using fluoride fibres. Unlike fibres based on silica glasses, which have a high softening point but a usefully low dependence of viscosity on temperature, fibres based on fluoride glasses have not only a low softening point, but are also very sensitive to temperature in that their viscosity falls rapidly with increasing temperature, typically their full viscosity range is within 100° or less. As a result, it is believed that no-one has previously succeeded in producing fused fibre couplers using fluoride based fibres. The present invention, however, with its accurate control of temperature and other process variables, enables the successful production of fused fibre couplers using fluoride fibres.

For example, successful coupler production is achievable from fibres made of ZBLAN glass (a glass containing fluorides of zirconium, barium, lanthanum, aluminium and sodium) with a lead fluoride additive to increase the core index. Typically, the fibres have a 70 μm core and an outer diameter of 140 μm, and the drawing temperature is about 260° C. at a drawing tension of 0.2 to 0.5 gm. In this case, the length of pull is about 20 mm, and fine stepper motor control is required (0.1 μm/step) as fluoride based fibres are very brittle. Moreover, the pyrometer includes an InAs detector instead of a silicon detector. Temperature control to better than 1° C. (which is required because of the recrystallization of fluoride based fibres) is achievable with the furnace of the invention. Furthermore, the furnace is capable of the very uniform temperature profile that is essential to sucessful coupler production using fluoride based fibre whose viscosity is extremely temperature sensitive.

We claim:

1. Apparatus for fabricating fused optical fibre devices with the method the apparatus comprising;
   an electric heating element,
   a heat-distributing material disposed in intimate contact with the heating element,
   an elongate heating chamber for an optical fibre arrangement being defined within the heating element and the heat distributing material,
   means for passing electric current through the heating element, and
   means for supplying and maintaining an inert atmosphere within the heating chamber,
   wherein the insert extends substantially the entire length of the heating chamber so that, in use, the heating chamber attains a substantially uniform temperature, and
   wherein the combined thermal capacity of the heating element and the insert is such that an optical fibre device placed within the heating chamber is heated to fusion temperature within 1 to 30 seconds.

2. Apparatus as in claim 1, wherein said combined thermal capacity is such that fusion temperature is reached in less than 10 seconds.

3. Apparatus as in claim 1 wherein said combined thermal capacity is such that fusion temperature is reached after at least 1 second.

4. Apparatus as in claim 1, wherein the heating element has a generally C-shaped portion which defines the heating chamber.

5. Apparatus as in claim 4, wherein the C-shaped portion has a diameter of between 4.5 and 5 mm.

6. Apparatus as in claim 5, wherein the C-shaped portion has a diameter of 4.7 mm.

7. Apparatus as in claim 4, wherein the C-shaped portion has a length of between 2 and 5 mm.

8. Apparatus as in claim 4, wherein the C-shaped portion has a length of between 9 and 15 mm.

9. Apparatus as in claim 1, wherein the heating element is made of tungsten or tantalum.

10. Apparatus as in claim 1, wherein the heat-distributing material comprises a ceramic material.

11. Apparatus as in claim 10, wherein the heat-distributing material is a slotted alumina tube, the slot being aligned with the opening in the C-shaped portion of the heating element.

12. Apparatus as in claim 11, wherein the tube has a wall thickness of 0.95 mm and a slot width of 1.0 mm.

13. Apparatus as in claim 4, wherein:
    the heating element further comprises wing portions extending in opposite directions away from the C-shaped portion, the wing portions being clamped to conductive blocks which form the base of the apparatus,
    the conductive blocks being separated by an insulating spacer and constituting electrodes for supplying electric current to the heating element.

14. Apparatus as in claim 13, further comprising:
    a top which fits over the base, the top comprising a pair of conductive blocks which are separated by an insulating spacer,
    the conductive blocks of the top being aligned with the conductive blocks of the base.

15. Apparatus as in claim 14, wherein sealing means are provided between the top and the base, the sealing means being effective to maintain an inert atmosphere within the heating chamber.

16. Apparatus as in claim 14, wherein the top and the base are provided with complementary alignment means.

17. Apparatus as in claim 13, wherein the insulating spacers between the blocks of the top and the base are such that, when the top and the base are fitted together, a channel is defined by the blocks and the spacers, the channel passing substantially centrally through the apparatus and constituting an optical fibre arrangement receiving channel.

18. Apparatus as in claim 17, wherein the channel has a widened, cigar-shaped, central portion for receiving the heating element, the widened portion being formed by cut-out portions in the blocks.

19. Apparatus as in claim 18, wherein a gas inlet pipe passes through one of the blocks and opens into the central region of the widened channel portion.

20. Apparatus as in claim 19, further comprising means for supplying an inert gas to the inlet pipe at a pressure slightly greater than atmospheric.

21. Apparatus as in claim 13, further comprising a silica rod window provided in one of the insulating spacers, the silica rod window being aligned with the central region of the widened channel portion.

22. Apparatus as in claim 21, further comprising a pyrometer which is aligned with the silica rod window so as to measure the temperature within the heating chamber.

23. Apparatus as in claim 22, wherein the temperature measured by the pyrometer is used to control the electric current supplied to the heating element via a temperature controller and a thyristor power controller, the temperature controller being controlled by a computer.

24. Apparatus as in claim 23, wherein the thyristor power controller controls the supply of AC power to the heating element via a step-down transformer.

25. Apparatus as in claim 1, further comprising means for tensioning the optical fibre arrangement.

26. Apparatus as in claim 25, wherein the tensioning means includes stepper motors.

* * * * *